3,155,617
DISPERSING CALCIUM CARBONATE
Vanderveer Voorhees, Los Altos, Calif., assignor to Bray Oil Company, Los Angeles, Calif., a limited partnership of California
No Drawing. Filed Mar. 20, 1962, Ser. No. 181,147
11 Claims. (Cl. 252—33.2)

This invention relates to dispersions of calcium carbonate in oils, particularly colloidal dispersions, in which the particle size is below approximately 0.1 micron, and to a process of making these dispersions. The invention relates more particularly to the manufacture of lubricating oils containing dispersions of calcium carbonate in which the particles are sufficiently small that the oils are transparent to the unaided eye.

In the lubrication of internal combustion engines and other machinery, it has been found that the formation of sludge deposits is associated with the oxidation of the oil and is accelerated by various catalysts, particularly acids formed in the oil from oxidation or acids which are absorbed by the oil, e.g., from the combustion of sulphur and halogen compounds in internal combustion engines. It has also been found that if the acids are neutralized instantly, the rate of sludge formation can be greatly reduced so that the useful life of the oil in the engine is extended far beyond that of the oil which is not protected by neutralizing agents. It has also been found that calcium carbonate is one of the most satisfactory neutralizing agents for the purpose, because of its high water insolubility and the fact that it reacts neutral but is capable of neutralizing all acids encountered in lubricating oils which are stronger than carbonic acid. It is therefore considered to possess "reserve alkalinity."

In order to utilize the valuable protective properties of calcium carbonate, it is necessary that it be dispersed in the oil in such a fine state of subdivision that it will not interfere with the operation of machinery in which the oil is employed as a lubricant. This necessitates that the particle size be sufficiently small that the oil will be transparent to visible light and readily filterable through ordinary filtering media, such as filter paper. When larger particles are present in the oil, making the oil cloudy or murky, there is great danger that abrasion of bearing surfaces will result and the coarse particles may even settle out of the oil on long standing.

A number of processes have been devised for preparing dispersions of calcium carbonate of the desirable characteristics hereinabove referred to. Most of these processes involve precipitation of the calcium carbonate from solutions of calcium salts in the presence of emulsifying agents which act as peptizers to prevent agglomeration of the particles and coagulation of the emulsions. One process as exemplified by the patent of Warren et al. 2,839,470 prepares an emulsion of calcium hydroxide in lubricating oil in the presence of an emulsifying agent, such as oil soluble sulfonate, and then precipitates the calcium carbonate by the action of carbon dioxide. Water is essential to this reaction and close control of the amount of water present is important in producing a satisfactory, transparent, filterable oil product.

Another process largely avoids the presence of water by employing alcohols, especially the lower alcohols of 1 to 6 carbon atoms. This process is exemplified by the patent of Ellis et al. 2,865,956 and the Canadian patent of McMillen et al. 574,161, according to which calcium hydroxide, oil and emulsifying agent, such as petroleum sulfonate or alkyl salicylate, are treated with carbon dioxide. It has also been found, according to Carlyle Patent 2,956,018, that if calcium hydroxide is treated with carbon dioxide in the presence of a lower alcohol of 1 to 5 carbon atoms, a complex compound can be produced which can be dispersed in hydrocarbon oil containing a dispersing agent, such as calcium sulfonate, thereby producing the desired transparent dispersion of calcium carbonate. This process is plagued with numerous mechanical difficulties of handling bulky, solid materials which tend to cake on heating surfaces and deteriorate, with resulting agglomeration to form undesirably large particles, which cannot be tolerated in the lubricating oil product and which can only be removed from the oil with great difficulty owing to their substantially unfilterable particle size range.

In an earlier application of the applicant, Serial Number 853,631, filed November 17, 1959, of which this application is a continuation in part, it was found that when calcium oxide is employed in a reaction of the type shown by Ellis, the only alcohol which was operable in the process was methanol. It was found also that when using calcium oxide, the reaction should be conducted in the substantial absence of water. It was still further found that the activity of calcium oxide varied greatly, depending on its method of manufacture and that the calcium oxide prepared by the roasting of calcium hydroxide was far more active than the ordinary calcium oxide of commerce which is made by roasting calcium carbonate (limestone), usually at a much higher temperature. For convenience, this process is herein called the "methanol process."

I have now discovered that the calcium oxide of commerce made by roasting various forms of calcium carbonate, such as calcite, marble, or limestone, at temperatures upwards of 2000° F. can be activated for use in the methanol process by initially treating the calcium oxide in suspension in methanol with a small amount of an acid. To obtain uniform contact between acid and oxide, it is desirable to dilute the acid with methanol and add the solution gradually to the oxide suspension while agitating vigorously. In this manner, each particle of the calcium oxide is contacted with the acid and rendered active in the later reaction with oil, dispersant and $CO_2$.

The mechanism of the reaction by which acids bring about an activation of the calcium oxide is not fully understood. It is believed, however, that a reactive center or nucleus is formed on the surface of each oxide particle by the acid which forms a calcium salt at the point of contact. This calcium salt then proceeds to activate the entire particle by a sort of catalytic ion effect. It has been found that acids which produce highly insoluble calcium salts, such as oxalic acid, do not have an activating effect, probably owing to the absence of the desired catalytic calcium ion.

Acids having ionization constants equal to that of acetic acid—$1.75 \times 10^{-5}$, or higher are desirable. When activating with acids, water should be avoided. Accordingly, I prefer to employ the acids in the form of their anhydrides or the concentrated acids, free of water. Examples of acids I may use are the mineral acids, HCl (gas), sulfamic acid, $H_2SO_4$, $HNO_2$, and $HNO_3$, and the organic acids, chloracetic (mono, di and tri), formic, salicylic, levulinic, lactic, itaconic, and alkane sulfonic acids. The amount of acid required is usually about .001 to .02 equivalent, based on the calcium oxide.

My process is illustrated by the following examples which show the preparation of dispersions of calcium carbonate in oils, employing calcium sulfonate as the dispersing agent. The calcium sulfonate employed was prepared by the sulfonation of solvent refined lubricating oil distillate having a viscosity of about 400 SSU at 100° F., followed by conversion of the sulfonic acids to calcium soaps. The molecular weight of the sulfonic acids was about 450 to 480. They are preferentially oil soluble and commonly known as "mahogany" acids. They were purified by the process described in the patent of Bray 2,689,221. The calcium soaps are usually employed in solution in lubricating oil at a concentration of about 25 to 60% by weight. Sulfonates prepared from olefinic polymer benzene alkylates, such as poly propylene benzene and poly butene benzene having upwards of 20 carbon atoms, are also suitable surface active agents or dispersants. I can also use other oil soluble dispersants such as salts of naphthenic acids, salts of phosphorous acids derived from treatment of olefines of upwards of 20 carbon atoms with $P_2S_5$, alkyl salicylates, and the like well known dispersants or detergents employed in lubricating oils.

The principal steps of the process are the suspension of finely ground calcium oxide in water-free methanol with agitation, then addition of the activator acid, preferably in methanol solution, followed by the addition of the calcium sulfonate-oil solution and carbonation with $CO_2$. Sulfonates of other metals or metalloids can be used such as sodium, barium, magnesium, lithium, ammonium, or amines.

It is desirable to employ a hydrocarbon diluent in the reaction—usually added with the sulfonate-oil. However, it may be added with the methanol or divided, part being present with the methanol and part added later. Suitable diluents are petroleum naphthas, either aromatic or paraffinic and aromatic solvents such as benzene, toluene or xylene or mixtures thereof. To facilitate recovery, it is desirable to employ a solvent boiling in the range of about 250 to 300° F. Typical solvents are Stoddard naphtha, varnish makers and painters naphtha (VM & P) and petroleum xylene.

The reaction mixture is stirred rapidly to maintain a uniform mixture and $CO_2$ is passed in. Absorption is rapid with evolution of heat which may require cooling to prevent loss of methanol by distillation which occurs at about 150° F. Generally, it is desirable to start the carbonation reaction at about 80–100° F. Pressure of the order of 5 to 50 p.s.i. gauge may be employed to increase the rate of absorption of $CO_2$ but is not required. The reaction is complete in 10 to 30 minutes, although a longer reaction time may be employed—for example, one to two hours—if more convenient. The $CO_2$ can be introduced as a liquid in which case the latent heat assists in cooling the reaction. The reaction can be either batch or continuous.

When carbonation is complete, as shown by the incapacity of the mixture to absorb more $CO_2$, the methanol is distilled off, generally with part of the diluent hydrocarbon. The distillate mixture can be used without separation in the next batch. A temperature of 250° to 275° F. may be required to remove the methanol which tends to remain as a complex. Stripping with vapors of the diluent, preferably superheated to 300–500° F., is helpful in recovering anhydrous methanol.

After removal of methanol, about 1% to 20% of water is added to the reaction mixture, based on the soap-oil charge. The water serves to destroy gels which otherwise may make the product excessively viscous or solid when the diluent is removed. Diluent is now removed by distillation, using steam if desired. The product oil is then filtered to remove dirt and any unreacted lime. Filter aid such as diatomaceous earth (diatomite) is helpful, suitable commercial aids being known as Filter-Cel, Hy-Flo, Super-Cel, and Dicalite. The product should filter rapidly if substantially all the lime has been dispersed in the form of carbonate particles of less than one micron diameter. Generally, the particles are far smaller—below 0.1 micron diameter—and invisible under a microscope (sub-microscopic). The oil containing the dispersed calcium carbonate is clear (transparent) and usually opalescent.

*Example 1*

A commercial lime (CaO) specially ground and air classified to 300 mesh and finer was used. In a turbine mixer were combined 25 gm. of CaO, 200 cc. methanol, 200 cc. petroleum xylene fraction and 100 gm. calcium mahogany sulfonate—40% in lubricating oil. $CO_2$ was passed into the mixture at a rate of one liter per minute and the temperature observed as follows:

|  | ° F. |
|---|---|
| Start $CO_2$ | 106 |
| 4 minutes | 104 |
| 10 minutes | 101 |
| 15 minutes | 99 |
| 20 minutes | 98 |

The reaction was terminated in 20 minutes and the mixture heated in a pan to evaporate methanol. Most of the methanol was off at 200° F. The mixture was treated with 10 cc. water and boiled until dehydrated at 250° F. The solution was then filtered to remove the unreacted solids, mostly calcium hydroxide and carbonate, then stripped of solvent by heating to 400° F. and refiltered. The alkali value was determined to be 3.5 (phenolphthalein) and 185 (methyl orange). Assuming 90% active CaO, the theoretical alkali value is calculated to be 340 with this ratio of lime to oil-sulfonate. Accordingly, the utilization of lime in this experiment was only 54%.

*Example 2*

Twenty-five grams of the same lime as used in the previous example were mixed with 150 cc. methanol in the turbine mixer. To this was added, while agitating, 2 gm. acetic acid (glacial) in 50 cc. methanol. The temperature rose 10° F. There was then added 100 gm. calcium mahogany sulfonate-oil solution diluted with 90 cc. petroleum xylene solvent. $CO_2$ gas was then led into the mixture while agitating, viz:

| Start | 140° F. |
|---|---|
| 3 minutes | 140° F. |
| 6 minutes | 145° F. |
| 9 minutes | 140° F.—40 cc. more solvent added. |
| 11 minutes | 138° F. |
| 13 minutes | 139° F.—20 cc. more solvent added. |
| 15 minutes | 136° F.—Remainder of 200 cc. solvent added. |
| 18 minutes | 123° F.—Experiment terminated. |

The mixture was heated in a pan to expel methanol which was largely accomplished at 210° F. Water—100 cc.—added to the hot mixture caused it to become a granular solid which reverted to a milky emulsion in a few minutes. It was heated to 400° F. to expel water and solvent, then filtered on a suction filter using Hy-Flo filter aid. The oil was clear, orange-red in color, and titrated 14 alkali value (phenolphthalein indicator) and 340 (methyl orange). This high value indicates substantially complete utilization of the calcium oxide in the reaction, owing to the activating effect of the acetic acid. The amount of acid required to give this result is so small as to form a negligible amount of calcium acetate in the product. On the basis of molecular equivalents, 2 gm. of acid is .034 mol whereas 0.9 equivalent of calcium oxide were employed—a stoichiometric ratio of 1 to 26.

Owing to the fact that substantially all the lime was dissolved in the oil-sulfonate as colloidal carbonate, almost no solids were left to be removed by filtration. Accordingly, the filtration in solvent could be omitted and the final hot filtration was rapid.

*Example 3*

In this experiment, the same lime as in Example 1 was employed, activated with .038 equivalent of acetic acid in methanol and petroleum xylene. The calcium sulfonate-oil solution had an initial alkali value of 40 (methyl orange) from previous superbasing. To 25 gm. CaO was added 200 cc. methanol and 2 gm. acetic acid, 100 cc. petroleum xylene being added in the activation stage and 100 cc. added with the sulfonate-oil (100 gm.). The starting temperature for carbonation was 125° F. increasing exothermically to 147° F. in eight minutes. After fifteen minutes, the reaction was terminated and the mixture heated carefully. A strong tendency to gel and congeal on the heating surface was mitigated by addition of more aromatic solvent. At 210° F. was added 100 cc. water which produced a granulation followed by the formation of a thin emulsion which was dehydrated to 400° F. and filtered on suction at a satisfactory rate. The clear, viscous oil product had an alkali value of 31 (phenolphthalein) and 405 (methyl orange).

*Example 4*

Into 200 cc. methanol was dispersed 25 gm. (0.9 equivalent) of calcium oxide taken from a different lot from the same supplier of the oxide used in Example 1, from roasting limestone and fine grinding. While rapidly agitating, there was added gradually 1 gm. (.017 mol.) acetic acid (glacial). The temperature rose from 108 to 125° F. To the mixture was then added 100 gm. calcium sulfonate-oil (40%) dissolved in 200 cc. aromatic hydrocarbon solvent. $CO_2$ gas was then passed into the mixture at the rate of one liter per minute while rapidly agitating. In six minutes, the temperature rose from 127° F. to 146° F., approximately the boiling point of methanol. After ten minutes, the temperature began to fall, showing nearly complete absorption of $CO_2$. The reaction was terminated when the temperature fell to 120° F. in twenty minutes total reaction time. The product was heated slowly in a pan to 210° F., sticking badly and becoming a mush. Most of the methanol was evaporated at this temperature. To the mass was then added 100 cc. of water, causing a granulation of the mass, then, within a few minutes, reversal to a milky emulsion. This was dehydrated to 420° F. and filtered easily with diatomite aid. The product was a clear oil testing 20 alkali value with phenolphthalein and 340 with methyl orange showing complete absorption of the calcium oxide used.

This experiment was repeated, using half the amount of acetic acid activator, giving a product of 320 alkali value.

In a control run made with the same lime under the same conditions without activator, no exothermic reaction ensued, even though started at 142° F. In four minutes, the temperature had dropped to 122° F., showing substantially no activity for this lime.

*Example 5*

This run was made with the same sulfonate-oil stock as used in the previous example, but with calcium oxide from the lot used in Example 1, at the same ratio—25% by weight based on the sulfonate-oil. It was activated in methanol suspension with 4% by weight (.0106 mol.) of monochlor acetic acid in methanol solution. The reaction with $CO_2$ was rapid, yielding a clear oil which filtered easily. Alkali value: 30 (phenolphthalein) and 323 (methyl orange).

*Example 6*

This run was the same as the preceding example except that acetic anhydride activator was used in the amount of 4% based on the calcium oxide. The product was a clear oil having an alkali value of 40 (phenolphthalein) and 325 (methyl orange).

*Example 7*

In this run, calcium oxide from a new lot was used. An attempt was made to activate it with 4% of oxalic acid based on weight of oxide. The acid was first dissolved in methanol as in previous examples. When $CO_2$ was injected into the rapidly agitated mixture with sulfonate and solvent, no reaction ensued, the temperature falling from 115° F. to 111° F. in two minutes. The experiment was terminated when the temperature reached 102° F. Clearly, the oxalic acid had no activating effect on the oxide, owing apparently to the insolubility of calcium oxalate—.00067 part per 100 of water.

*Example 8*

The same lot of oxide as in the previous example was activated with 3% by weight of acetic acid and used in the ratio of 34% of the calcium sulfonate-oil stock. The reaction mixture contained initially 2 volumes methanol, one volume aromatic hydrocarbon solvent, and one volume of sulfonate (40%) with 34 parts of calcium oxide treated with one part of acetic acid (glacial) per 100 parts of stock by weight. $CO_2$ was led into the rapidly agitated mixture at a rate to give a temperature rise of 5° F. per minute, all $CO_2$ being absorbed. Thickening of the mixture took place, requiring more hydrocarbon solvent from time to time. The temperature reached 150° in ten minutes, then fell to 114° in seventeen minutes more. The reaction mixture was heated to 210° F. to remove dry methanol, thickening and sticking on the hot surfaces occurring. Water (0.5 volume) was added to reverse the emulsion which was then dehydrated to an oil at 400° F. The viscous clear, oil filtered slowly, owing to its high viscosity.

Analysis:
    Alkali value—35 (phenolphthalein), 405 (methyl orange)
    Ash (sulfated)—49.7%

This experiment shows that, by use of the calcium oxide activator, it is possible to make a transparent, fluid dispersion of submicroscopic calcium carbonate in oil in which the weight of the carbonate substantially equals the weight of the oil.

*Example 9*

Calcium oxide from the same lot used in Example 1 was used in this run in the amount of 16 pounds, 2 ounces. This was mixed was 19.2 gallons of a mixture of methanol and aromatic hydrocarbon solvent (20%) in a one barrel supply tank equipped with a propeller agitator and connected at the bottom with a circulating loop of pipe and a motor driven rotary gear type pump used as a mixer. To this mixture was added a solution of 292 gm. glacial acetic acid in 5 gallons of the same methanol-solvent mixture above referred to, at 120° F. There was next added 16 gallons of a mixture of equal volumes of calcium sulfonate-lubricating oil (40%) and aromatic solvent containing 69.3 pounds oil and sulfonate. The solvent was substantially xylene made from petroleum having approximately the following characteristics:

| | |
|---|---|
| Gravity, API | 35 |
| Boiling range ° F | 272–288 |
| Flash ° F | 82 |
| Kauri-Butanol No. | 83 |
| Aniline point (mixed) ° F | 67 |

The sulfonate mix was added at 120° F., then the mixture was circulated through the mixing loop while $CO_2$ was injected into the pump at the rate of about 0.24 lb./min., the pressure in the loop holding at about 8–10 p.s.i. The temperature rose to 133° F. in the reaction loop in 25 minutes, then declined to 123° F. at shutdown. The total time was forty-five minutes and 8 lbs., 12 ounces of $CO_2$ were consumed. The product was transferred to a still heated by a pipe coil connected to a steam supply. Methanol was distilled off for use in a later run. The solution of oil and sulfonate was then filtered to remove excess lime, a small plate and frame press clothed with canvas and precoated with Hi-Flo filter aid being used for the purpose. The filtrate was then returned to the still, stripped free of solvent and water with wet steam, then refiltered hot. The clear red oil was titrated against standard acid and showed an alkali value of 7 (phenolphthalein) and 275 (methyl orange), or 85% of theory based on pure CaO.

Example 10

To 100 cc. methanol in a turbine mixer was added 30 grams of CaO from the same commercial lot used in Example 1, finely classified to pass 300 mesh. Then 250 cc. petroleum xylene diluent was added and, while mixing, a warm solution of 1 gram of sulfamic acid in 50 cc. methanol was added to activate the lime. Next was added a solution of 100 grams of calcium mahogany sulfonate-oil (40%) and 50 cc. more diluent. The mixture was then treated with $CO_2$ gas as follows:

|  | °F. |
|---|---|
| Start | 88 |
| 5 minutes | 108 |
| 9 minutes | 122 |
| 15 minutes | 140 |
| 16.5 minutes | 136 |
| 18 minutes | 128 |
| 20 minutes | 124 |
| 29 minutes | 109 |

The fluid mixture was transferred to a pan and heated to expel methanol. Skinning and sticking occurred at 160° F. More diluent was added (200 cc.) and heating and stirring continued to 230° F., the reaction mixture being a soft mush. Water was added (100 cc.) to invert the phases, instantly producing a thin emulsion which was boiled and dehydrated to 350° F. It was filtered through a paper-covered suction filter precoated with Hi-Flo diatomite. Filtration was rapid, the filtrate being a clear, heavy oil testing 355 alkali value with methyl orange indicator. The theory for 30 weight percent CaO (pure) is 385 (365 for 95% CaO purity), showing that the activation of the oxide with this acid effected nearly quantitative utilization of the oxide.

Example 11

A cone bottom cylindrical reactor of 8,000 gal. capacity equipped with heating and cooling coil and turbine type agitator was charged with 3,448 gal. of methanol containing in solution 25% by volume of petroleum xylene. Next was introduced 2,340 pounds of calcium oxide from roasting limestone at 2200° F. and fine grinding to 300 mesh. Next was added 2,940 gal. more petroleum xylene and, while agitating, 100 pounds acetic acid (glacial) in solution in 50 gal. methanol. After thorough mixing, 2,519 gallons of a solution of calcium mahogany sulfonate-oil (40%) and an equal volume of petroleum xylene was added at a rapid rate, 2 minutes, being required. Carbon dioxide, gas and liquid, were passed into the mixture as follows:

| Time | Temperature, °F. | $CO_2$, lbs. |
|---|---|---|
| Start | 112 | 0 |
| 3 minutes | 122 | 300 |
| 10 minutes | 134 | 900 |
| 15 minutes | 145 | 1,000 |
| 20 minutes | 145 | 1,100 |
| 25 minutes | 142 | 1,200 |
| 30 minutes | 135 | 1,350 |
| 35 minutes | 130 | 1,450 |
| 40 minutes | 128 | 1,500 |
| 45 minutes | 125 | 1,500 |

Heat was next applied through the coil, distilling off methanol which was condensed and returned to the supply tank. The temperature was increased to 270° F., sufficient to remove all the methanol and part of the aromatic solvent. Then the reaction was cooled to 200° F. and 100 gallons of water were introduced with agitation to prevent gel formation in subsequent separations. The charge was then heated again to 250° F. to dry it and then it was conducted to a filter press after first mixing with about 1% by weight of diatomaceous filter aid. The clear filtrate was then stripped free of solvent in a steam still and finally filtered hot to remove accidental dirt from the last operation. The product was a clear, free flowing heavy red oil having an alkali value of 310 when titrated with methyl orange indicator.

Example 12

Inactive commercial calcium oxide (ignition loss—1.11%) was activated with nitric acid as follows: 25 gm. CaO was dispersed in 100 cc. methanol and 1 gm. of $HNO_3$ (100%) in solution in 13 cc. methanol was added. To this was added 100 cc. varnish makers naphtha and the mixture was agitated 5 minutes. Then was added 100 gm. calcium sulfonate-oil with 150 cc. more naphtha. On carbonation with $CO_2$, the temperature rose from 97° F. to 136° F. in 15 minutes. Methanol was then evaporated to a temperature of 180° F., the solution becoming a gel. Fifty cc. water was added, converting the gel to a solid mush which quickly reverted to a thin emulsion. After dehydrating to 350° F. and filtering, the clear red oil was titrated. Alkali value—320. This is nearly the theory—340, calculated for pure CaO.

Example 13

A solution of $HNO_2$ was prepared from $NaNO_2$ in methanol by treating with concentrated $H_2SO_4$ and separating the sodium sulfate. The solution titrated 1.2 acid value. To 25 gm. commercial calcium oxide of low activity was added 100 cc. methanol and 100 cc. of petroleum xylene, then, while agitating, 50 cc. of the above $HNO_2$ solution. After 5 minutes activation was added 100 gm. of oil containing 40% by weight of calcium mahogany sulfonate diluted with 100 cc. petroleum xylene. $CO_2$ was passed into the mixture while agitating, the heat of reaction raising the temperature from 88° F. to 136° F. in 14 minutes, after which it fell rapidly to 120° F. in 5 minutes. The methanol was evaporated from the product to 220° F., then 50 cc. water was added and the mixture dehydrated to 400° F. After filtering, the oil was brilliantly clear and titrated 14 alkali value (phenolphthalein) and 310 (methyl orange). Nitrous acid for this activation can also be made by dissolving $N_2O_3$ in methanol, preferably in the presence of the calcium oxide.

It is desirable to recover the methanol used in my process without contamination with water, thereby avoiding the cost of drying it, for example, by careful fractionation, before using it over. When making oils of high alkali value, upwards of 250, the reaction mixture often becomes a solid gel or mush when removing methanol at temperatures of about 150 to 200° F. The use of a high ratio of solvent to sulfonate-oil is advantageous in avoiding fouling of heating surfaces when this condition is encountered, a suitable ratio being three to four volumes of hydrocarbon solvent to each volume of sulfonate-oil. When using aromatic solvents, such as toluene or xylene, the gels are less troublesome than with paraffinic solvents such as VM & P, Stoddard solvent and other petroleum naphthas.

I find it convenient to strip out methanol from the reaction mixture by introducing vapors of the hydrocarbon solvent, preferably superheated. Thus, xylene vapors can be injected into the reaction mixture at a temperature of 300 to 500° F., the methanol and some xylene being condensed for further use in the process.

Analyses of the oils reported herein were made by standard methods, viz:

Ash—ASTM No. D482–46. Ash is usually reported as sulfated ash.

Alakli value—ASTM No. D974–58T, modified as follows:

Sample—2 gm. for alkali values above 100. 10 gm. for alkali values below 100.
    Dissolve sample in 100 cc. carbon tetrachloride.
    Add 50 cc. NaCl solution—15%.
    Add 50 cc. methanol.
    Add indicator.

Titrate hot with standard HCl—0.1787 N. When using a ten gram sample, the volume of acid in cc. is the alkali value. When using a 2 gram sample, the burette reading must be multiplied by 5 to obtain the alkali value.

Although I have described my invention with respect to various examples, it is not intended that it be limited thereby except as set forth in the following claims.

I claim:

1. The process of making a colloidal dispersion of calcium carbonate in oil which comprises dispersing in anhydrous methanol, calcium oxide of commerce derived from roasting calcium carbonate ores at high temperature, activating said oxide by contacting with a small amount, in the range of .001 to .038 equivalent per equivalent of calcium oxide, of an acid capable of forming a water soluble salt with calcium, mixing with the activated oxide and methanol, an oil and an oil soluble dispersant comprising a salt of an organic acid having upwards of 20 carbon atoms, introducing carbon dioxide into the mixture until substantially all said oxide is converted to calcium carbonate in colloidal form having particles of submicroscopic dimensions, removing anhydrous methanol from the reaction product and recovering the oil-sulfonate as a clear, filterable, free flowing liquid containing dispersed calcium carbonate.

2. The process of claim 1 wherein a hydrocarbon solvent is added to the reaction mixture to reduce the viscosity of the oil during the carbonation reaction.

3. The process of claim 1 wherein the activating acid is characterized by an ionization constant upwards of $1.75 \times 10^{-5}$.

4. The process of claim 1 wherein the said activating acid is acetic acid.

5. The process of claim 1 wherein said activating acid is sulfamic acid.

6. The process of claim 1 wherein the reaction product, after removing methanol, is treated with water to decompose gels and thereafter dehydrated.

7. The process of claim 3 wherein the amount of activating acid employed is about .001 to .02 equivalent based on the equivalents of calcium oxide employed.

8. The process of dispersing calcium carbonate in lubricating oil in the form of submicroscopic particles providing reserve alkalinity and preventing formation of sludge, which comprises dispersing calcium oxide derived from roasting limestone at high temperature above 2000° F. in anhydrous methanol, activating the dispersed oxide with a small amount of an acid capable of forming a water soluble salt with calcium, the amount of said acid being in the range of .001 to .038 equivalent per equivalent of calcium oxide, then mixing with lubricating oil containing preferentially oil soluble calcium petroleum sulfonate dispersant, carbonating the mixture with $CO_2$ to convert the oxide to calcium carbonate, removing anhydrous methanol by distillation and recovering the oil dispersion of calcium carbonate from the mixture.

9. The process of claim 8 wherein the amount of calcium oxide employed is about 20 to 30% of the weight of oil and sulfonate employed.

10. The process of claim 8 wherein a volatile hydrocarbon solvent is used in the reaction mixture during carbonation.

11. The process of claim 10 wherein said hydrocarbon solvent is substantially xylene.

References Cited by the Examiner

UNITED STATES PATENTS

| 2,695,910 | 11/54 | Asseff et al. | 252—33 XR |
| 2,865,956 | 12/58 | Ellis et al. | 252—33 XR |

FOREIGN PATENTS

| 209,175 | 7/57 | Australia. |
| 210,336 | 9/57 | Australia. |

DANIEL E. WYMAN, *Primary Examiner.*

JOSEPH R. LIBERMAN, *Examiner.*